(12) United States Patent
Finkenzeller

(10) Patent No.: US 11,111,971 B2
(45) Date of Patent: *Sep. 7, 2021

(54) CLUTCH SYSTEM AND METHOD FOR ACTUATING A CLUTCH SYSTEM

(71) Applicant: Schaeffler Technologies AG & Co. KG, Herzogenaurach (DE)

(72) Inventor: Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 411 days.

This patent is subject to a terminal disclaimer.

(21) Appl. No.: 15/774,388

(22) PCT Filed: Nov. 9, 2016

(86) PCT No.: PCT/DE2016/200505
§ 371 (c)(1),
(2) Date: May 8, 2018

(87) PCT Pub. No.: WO2017/080553
PCT Pub. Date: May 18, 2017

(65) Prior Publication Data
US 2020/0248759 A1     Aug. 6, 2020

(30) Foreign Application Priority Data
Nov. 12, 2015   (DE) .................. 10 2015 222 358.2

(51) Int. Cl.
*F16D 27/115* (2006.01)
*F16D 13/52* (2006.01)
(Continued)

(52) U.S. Cl.
CPC ............ *F16D 27/115* (2013.01); *F16D 13/52* (2013.01); *F16D 27/004* (2013.01); *F16D 27/01* (2013.01); *F16D 2023/123* (2013.01)

(58) Field of Classification Search
CPC .......... F16D 13/04; F16D 13/52; F16D 13/54; F16D 21/08; F16D 23/12;
(Continued)

(56) References Cited

U.S. PATENT DOCUMENTS 2,886,149 A * 5/1959 Baermann ............... F16D 27/06
192/18 B
2,956,658 A * 10/1960 Jaeschke ............... F16D 27/004
192/84.31

(Continued)

FOREIGN PATENT DOCUMENTS

CN      104471267 A    3/2015
DE   102004039264 A1   2/2006
(Continued)

OTHER PUBLICATIONS

International Search Report for PCT/DE2016/200505; 3 pgs; dated Mar. 7, 2017 by European Patent Office.

*Primary Examiner* — Richard M Lorence
(74) *Attorney, Agent, or Firm* — Kevin L. Parks

(57) ABSTRACT

A clutch system for a motor vehicle includes a friction clutch, a ramp system, a driver, and a magnetic clutch. The friction clutch includes a pressure plate, and is arranged for transmitting a torque between a torque admission element and a torque release element. The ramp system is for axially displacing the pressure plate. The ramp system has an input ramp and an output ramp, rotatable relative to the input ramp, for varying an axial extent of the ramp system as a result of a speed differential between the torque admission element and the torque release element. The driver is coupled to the input ramp and supported so as to allow relative rotation on the torque admission element. The magnetic clutch is for rotationally coupling the driver to the torque admission dement.

17 Claims, 3 Drawing Sheets

US 11,111,971 B2
Page 2

(51) Int. Cl.
  *F16D 27/01* (2006.01)
  *F16D 27/00* (2006.01)
  *F16D 23/12* (2006.01)

(58) Field of Classification Search
  CPC ............. F16D 2023/123; F16D 27/004; F16D 27/115; B60K 6/38; B60K 6/387
  USPC ............................ 192/35, 84.31, 84.7, 84.91
  See application file for complete search history.

(56) References Cited

U.S. PATENT DOCUMENTS

| | | | | |
|---|---|---|---|---|
| 2,962,144 | A * | 11/1960 | Manfred | F16D 27/004 192/84.31 |
| 3,000,479 | A * | 9/1961 | Mosbacher | F16D 27/115 192/35 |
| 3,263,784 | A * | 8/1966 | Pierce | F16D 27/112 192/84.31 |
| 3,899,061 | A * | 8/1975 | Krug | F16D 27/004 192/84.31 |
| 5,819,883 | A | 10/1998 | Organek et al. | |
| 6,564,917 | B2 * | 5/2003 | Katou | F16D 27/115 192/35 |
| 9,180,866 | B2 * | 11/2015 | Helmer | F16D 28/00 |
| 10,914,347 | B2 * | 2/2021 | Finkenzeller | F16D 27/004 |
| 2013/0048461 | A1 | 2/2013 | Pardee et al. | |
| 2019/0128339 | A1 * | 5/2019 | Finkenzeller | F16D 23/12 |

FOREIGN PATENT DOCUMENTS

| | | |
|---|---|---|
| DE | 102009017566 A1 | 10/2010 |
| DE | 202011051969 U1 | 9/2012 |
| DE | 102014213486 A1 | 1/2015 |
| DE | 102014216345 A1 | 2/2016 |
| JP | 2007-127257 A | 5/2007 |
| JP | 2008001284 A | 1/2008 |
| JP | 2009162326 A | 7/2009 |
| WO | 2011/050773 A1 | 5/2011 |

* cited by examiner

CLUTCH SYSTEM AND METHOD FOR ACTUATING A CLUTCH SYSTEM

CROSS-REFERENCE TO RELATED APPLICATIONS

This application is the United States National Phase of PCT Appln. No. PCT/DE2016/200505 filed Nov. 9, 2016, which claims priority to German Application No. DE102015222358.2 filed Nov. 12, 2015, the entire disclosures of which are incorporated by reference herein.

TECHNICAL FIELD

The present disclosure relates to a clutch system and a method for actuating a clutch system, which serves for coupling a drive shaft of a motor vehicle engine to at least one transmission input shaft of a motor vehicle transmission or a rotor of an electrical machine of a hybrid motor vehicle.

BACKGROUND

WO 2011/050773 A1 discloses a clutch system in the nature of a so-called booster clutch, in which a friction clutch embodied as a disconnect clutch can be actuated by means of a ramp system. For closing the friction clutch, the ramp system is able by means of a diaphragm spring to vary its axial extent through an output ramp, rotatable relative to an input ramp, and thereby to displace a pressure plate of the friction clutch. A clutch disk can thereby be pressed frictionally between the pressure plate and a counterplate of the friction clutch.

There is an ongoing need to be able to adjust a torque transmission in a drivetrain, particularly of a hybrid motor vehicle, easily and efficiently to suit different driving strategies in a sporty driving style.

BRIEF SUMMARY

According to the present disclosure a clutch system is provided for coupling a drive shaft of a motor vehicle engine to at least one transmission input shaft of a motor vehicle transmission or to a rotor of an electrical machine of a hybrid motor vehicle. The clutch system has a friction clutch, in particular one in the form of a multi-plate clutch, for transmitting a torque between a torque admission element, in particular a drive shaft of the motor vehicle engine, and a torque release element, in particular a transmission input shaft of the motor vehicle transmission or a rotor of the electrical machine, and a ramp system for axially displacing a pressure plate of the friction clutch. The ramp system includes an input ramp and an output ramp, rotatable relative to the input ramp, for varying an axial extent of the ramp system as a result of a speed differential between the torque admission element and the torque release element. The clutch system also has a driver coupled to the input ramp and supported so as to allow relative rotation on the torque admission element, and a magnetic clutch for rotationally fixed coupling of the driver to the torque admission element. The magnetic clutch includes an armature disk rotationally fixed to the driver but axially displaceable. The armature disk can be displaced by a permanent magnet for automatically closing the magnetic clutch, and the magnetic clutch includes a solenoid for opening the magnetic clutch by means of an electromagnetic field that can be generated by the solenoid and having a repelling action on the permanent magnet.

Compared to a fuel-saving style of driving, a sporty driving style as encountered particularly in sports cars is characterized by sudden, rapid acceleration and abrupt heavy braking. A gliding mode, in which the motor vehicle rolls forwards due to its own inertia, substantially without any power input, tends to occurs more frequently in a fuel-saving style of driving and scarcely at all in a sporty driving style. In heavy braking it can be important to slow the motor vehicle also with the aid of the drag toque of the motor vehicle engine in the form of a combustion engine, for example. It may be necessary or desirable, particularly in heaving braking, to reduce the stress on brake linings of a brake system, for example the thermal stresses caused by heating due to frictional energy, by also deriving some of the braking power from the motor vehicle engine.

The permanent magnet of the magnetic clutch ensures that when a solenoid is not energized the magnetic clutch is closed ("normally closed"). The input ramp is thereby coupled to the torque admission element and the output ramp to the torque release element, so that in traction mode, when the torque admission element overtakes the torque release element, the ramp system formed by the input ramp and the output ramp increases its axial extent and closes the friction clutch, thereby synchronizing the rotational speed of the torque admission element with the rotational speed of the torque admission element. When, in subsequent abrupt braking, trailing throttle conditions occur and the torque release element seeks to overtake the torque admission element, the friction clutch is closed, so that a torque can be introduced into the motor vehicle engine and the drag torque of the motor vehicle engine can be used for the braking power demand as so-called "engine braking". The fact that the magnetic clutch is still closed means that the input ramp remains synchronized with the torque admission element, so that a speed differential does not occur relative to the output ramp synchronized with the torque release element. The friction clutch thereby remains basically closed also in traction mode.

In the event, occurring somewhat less frequently in a sporty driving style, that the motor vehicle engine is to be detached from the drive train, for example in a gliding mode or purely electrical propulsion of the motor vehicle in the form of a hybrid motor vehicle, the solenoid can be energized, in order to open the magnetic clutch by generating a magnetic field having a repelling action on the permanent magnet. Since the driver coupled to the input ramp is supported so as to allow relative rotation on the torque admission element, the input ramp in the opened state of the magnetic clutch is no longer supported on the torque admission element, so that the friction clutch is able to open automatically of its own accord and in so doing turns the output ramp relative to the input ramp, with the result that the axial extent of the ramp system is reduced. Compared to a magnetic clutch embodied as a "normally open" clutch, in the magnetic clutch embodied as a "normally closed" clutch an energizing of the solenoid of the magnetic clutch is necessary only in operating situations which occur more rarely in a sporty driving style. Instead, in operating situations involving abrupt, heavy braking, which occur more frequently in a sporty driving style, an energizing of the solenoid of the magnetic clutch is not necessary in order to be able to slow the motor vehicle additionally by means of the drag torque of the motor vehicle engine. It is thereby possible to reduce the electrical energy demand in a sporty driving style. Through the use of the magnetic clutch embodied as a "normally closed" clutch, which acts on the driver supported on the torque admission element, the trailing throttle conditions for the motor vehicle engine, occurring more frequently in a sporty driving style, can be achieved without energizing of the solenoid of the magnetic clutch, so as to allow an easy and efficient adjustment of the torque transmission in a drivetrain, particularly of a hybrid motor vehicle, to suit different driving strategies in a sporty driving style.

The magnetic clutch, the ramp system and the friction clutch together may form a so-called booster clutch. In the closed state of the friction clutch, the torque admission element and the torque release element in non-slipping operation have substantially the same rotational speed. In the opened state of the friction clutch, the torque admission element and the torque release element may turn at a different rotational speed, so that a speed differential arises between the torque admission element and the torque release element. The torque flowing via the torque admission element is able to flow at least partially via the closed magnetic clutch, so that in the closed state of the magnetic clutch torque can be transmitted via the ramp system at least some of the time, thereby making it possible to reduce component stresses acting on the friction clutch. The varying extent of the ramp system serves to displace the pressure plate for closing the friction clutch. A displacement force for displacing the pressure plate can be derived from the torque transmitted via the freewheel. When the extent of the ramp system has altered to such a degree, for example, that the pressure plate is pressing on a clutch disk and/or plates of a multi-plate clutch, on cessation of the trailing throttle conditions the rotational speeds of the torque admission element and the torque release element are synchronized with one another, so that a speed differential no longer prevails. The ramp system may then remain in the position attained.

The output ramp can be coupled to the torque release element so that it is rotationally fixed but axially movable. The output ramp coupled to the torque release element, and the input ramp, which can be coupled to the torque admission element by way of the freewheel and/or the magnetic clutch, can thereby be rotated relative to one another in the event of a speed differential between the torque release element and the torque admission element. The ramps of the ramp system are able to slide directly on one another or can be turned relative to one another by way of at least one ball, cylinder or other rotatable element, so as to form a ball-ramp system. The facility for turning the ramps relative to one another allows the distance of either of the rear sides of the input ramp and the output ramp remote from the other, opposing ramp to vary, so that the axial extent of the ramp system can be accordingly reduced or increased. In particular, the rear side of the output ramp remote from the input ramp forms the pressure plate of the friction clutch. The maximum angle of rotation of the input ramp relative to the output ramp is more preferably limited, for example, by means of at least one stop, thereby avoiding the possibility, for example, of exceeding the maximum wear range of the friction linings of the friction clutch.

By selecting a suitable ramp gradient of the ramp system, it is possible to achieve a power transmission ratio. Furthermore, it is possible to shift the magnetic clutch out of the area of the pressure plate. The magnetic clutch can thereby, in particular, be positioned relative to the pressure plate so that it is at least largely radially inside the pressure plate, making it possible to utilize overall space radially inside the friction linings of the clutch disk. The frictional contacts of the clutch disk can thereby be provided in a relatively remote outer radial area, so that a correspondingly small extent of the friction clutch radially inwards is needed in order to afford a correspondingly large friction surface. The friction clutch may take the form of a multi-plate clutch or a multi-disk clutch, for example. Frictional heat from the friction clutch can preferably be dissipated by means of a coolant, in particular oil, so that the friction clutch can, in particular, be embodied as a wet multi-plate clutch.

The armature disk can be produced from a material receptive to magnetic forces, for example a ferromagnetic material. The solenoid may include a current-carrying coil, which in particular is wound around an iron core. The permanent magnet is fixed, for example rotationally fixed, to the armature disk or to a component carrying the solenoid. The friction clutch may be used, in particular, for a manual shift transmission of a motor vehicle. The friction clutch may serve to provide a "Clutch-by-Wire" system, in which the friction clutch is actuated not by mechanical, hydraulic or pneumatic means, but electrically. The friction clutch may thereby be designed as an "E-clutch".

In particular, the driver is supported on the torque admission element by a radial bearing, designed in particular as a rolling element bearing. The radial bearing can be bridged by the magnetic clutch. Since in a sporty driving style the drag torque of the motor vehicle engine is needed especially often for braking purposes, it is not necessary to fundamentally avoid trailing throttle conditions by means of a freewheel acting between the driver and the torque admission element. Instead, it is possible to provide the compact and cost-effective radial bearing of more simple construction, which is anyway bridged by the magnetic clutch designed as a "normally closed" clutch, in the operating situations most frequently encountered in a sporty driving style. In the less frequent operating situations in which the magnetic clutch is opened, the radial bearing readily allows a speed differential between the torque admission element and the torque release element for actuating the friction clutch, this being possible whether in traction mode or under trailing throttle conditions.

The permanent magnet is preferably magnetically coupled to a soft-magnetic outer armature part arranged at least in part radially outside the permanent magnet and/or to a soft-magnetic inner armature part arranged at least in part radially inside the permanent magnet. The armature part is capable of easily conducting the magnetic field of the permanent magnet to a desired point. Here the generally rather brittle and hard-to-machine permanent magnet may have a simple design shape, whilst the more easily machined armature part may have a correspondingly more complicated geometry to suit the desired magnetic field. For example, the permanent magnet is designed as a ring or ring segment with poles facing radially inwards and radially outwards, whilst at least the one armature part deflects the magnetic field substantially in an axial direction.

The permanent magnet is more preferably adhesively bonded to and/or cast with the outer armature part and/or the inner armature part. The position of the permanent magnet relative to the armature part can thereby easily be fixed. In particular, it is possible to provided a direct contact of the permanent magnet to the armature part and to provide the material used for the fixing outside the contact area in the nature of an at least partial encasement of the entity including the permanent magnet and the armature part. It is thereby possible to prevent any interference with the magnetic field at the transition of the permanent magnet to the armature part from an additional dielectric material.

In particular, a torque-transmitting coupling of the friction disk to the torque admission element for producing a frictional contact with the outer armature part and/or the inner armature part is provided in an axial direction between the armature disk and the solenoid. The armature disk may be pressed against the friction disk by the permanent magnet in order to produce a frictional connection. The armature disk preferably includes at least the one armature part. The armature part in the closed state of the magnetic clutch is pressed frictionally against the friction disk. For this purpose, the armature part may form a correspondingly large frictional contact area for the friction disk, so that it can still transmit a certain required nominal torque by frictional contact.

The solenoid is preferably connected to a direct current source. The direct current source is capable of providing a direct current in a first current direction and a direct current in a second current direction opposed to the first current direction. The current strength of the direct current is variably adjustable. The solenoid is capable of generating a magnetic force having a repelling or attracting action on the permanent magnet depending on the current direction. The magnetic clutch can be opened in response to the repelling magnetic force. The contact pressure in the magnetic clutch may be increased under the attracting magnetic force, so that a correspondingly greater torque can be transmitted by the magnetic clutch without slipping.

The armature disk is more preferably connected to the driver by way of a return spring designed, in particular, as a leaf spring, particularly for opening the magnetic clutch in the event of a reduction in the magnetic field generated by the permanent magnet. The return spring may predetermine a defined relative position of the armature disk in the magnetic clutch, particularly when the magnetic field of the permanent magnet is compensated for by the solenoid. In particular, the return spring may shift the armature disk into a relative position corresponding to the opened position of the magnetic clutch. If the permanent magnet is provided in the armature disk, the resulting air gap means that a lesser energization of the solenoid is sufficient to hold the magnetic clutch open, thereby serving to reduce the electrical power consumption. The return spring designed as a leaf spring allows an axial movement of the armature disk relative to the driver, the leaf spring at the same time nevertheless being able to transmit a torque.

In particular, the friction clutch includes an output part embodied in particular as an output plate carrier, coupled to the torque release element, and an input part, embodied in particular as an input plate carrier, coupled to the torque admission element. The input part is coupled to the torque admission element, and/or the output part to the torque release element by way of a compensating element, embodied in particular as a torque sensor, to compensate for any misalignment of the torque admission element relative to the torque release element in a radial direction and/or in a peripheral direction. The compensating element may compensate, in particular, for a limited rotation of the torque admission element relative to the torque release element occurring during the rotation of the input ramp relative to the output ramp. In addition or alternatively, the compensating element may compensate for a radial misalignment of a drive shaft of a motor vehicle engine relative to a transmission input shaft of a motor vehicle transmission. Unnecessary transverse forces inside the clutch system can thereby be prevented.

The present disclosure further relates to a method for operating a clutch system, which may be embodied and developed as described above, in a motor vehicle in which, with a motor vehicle engine of the motor vehicle switched off, the permanent magnet of the magnetic clutch closes the friction clutch, and for starting the motor vehicle engine the solenoid of the magnetic clutch is energized in order to open the friction clutch. The clutch in the form of a "normally closed" magnetic clutch, which acts on the driver supported on the torque admission element, serves to achieve the trailing throttle conditions of a motor vehicle engine occurring more frequently in a sporty driving style without energizing the solenoid of the magnetic clutch, so as to allow an easy and efficient adjustment of a torque transmission in a drivetrain, particularly of a hybrid motor vehicle, to suit different driving strategies in a sporty driving style.

In particular, the solenoid of the magnetic clutch is energized in order to open the friction clutch for an energy recuperation of an electrical machine acting on the torque release element and/or for a gliding mode of the motor vehicle. Electrical energy for opening the magnetic clutch is therefore only consumed in the operating situations tending to occur less frequently in a sporty driving style, such as the gliding mode or electrical recuperation mode for a traction battery of a hybrid vehicle.

BRIEF DESCRIPTION OF THE DRAWINGS

The present disclosure is explained below by way of example, referring to the drawings attached and preferred exemplary embodiments, in which each of the features presented below, both individually and in combination, may represent one aspect of the present disclosure. In the drawings.

DETAILED DESCRIPTION

Figure 1:
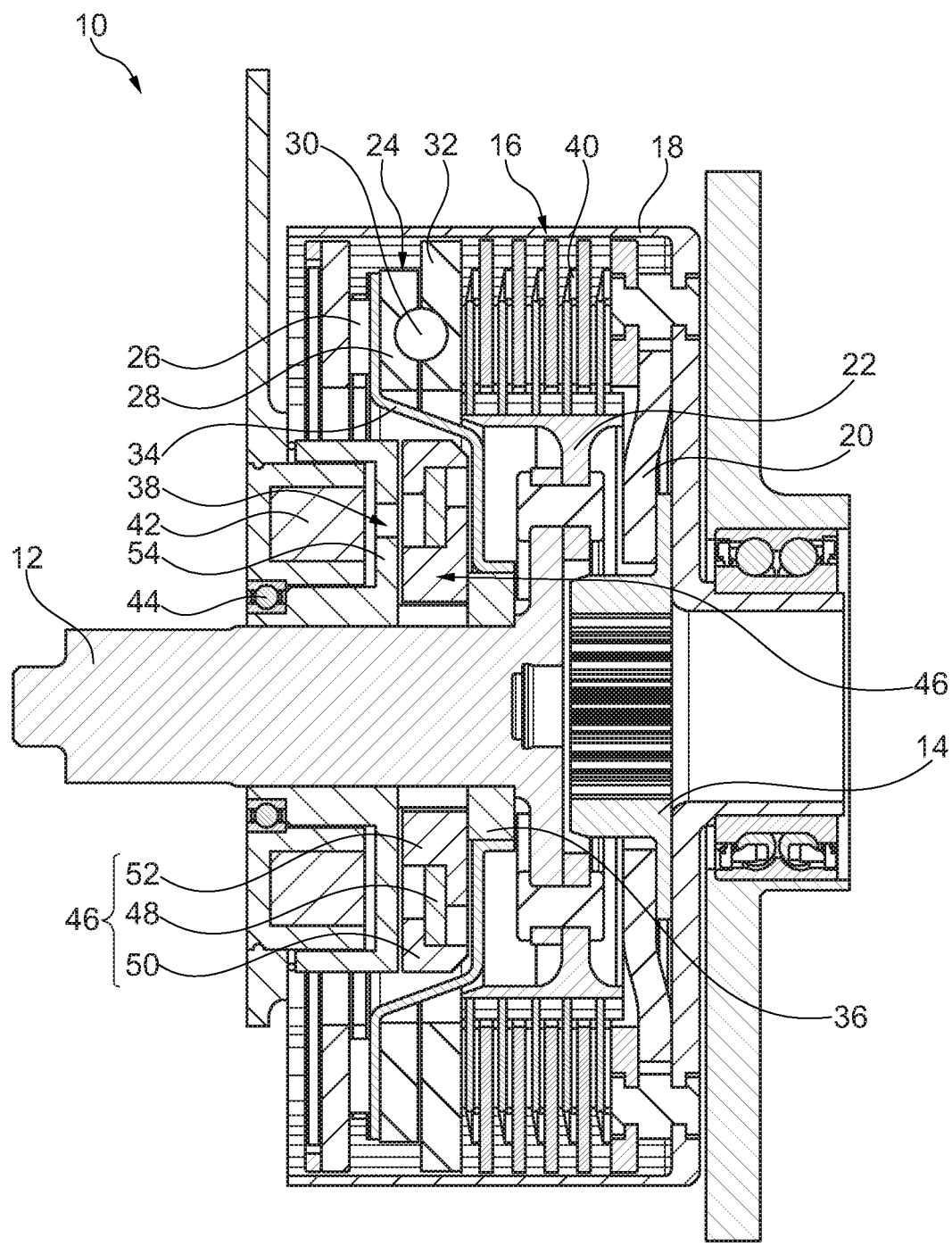
FIG. 1 shows a schematic sectional view of clutch system.
Figure 2:
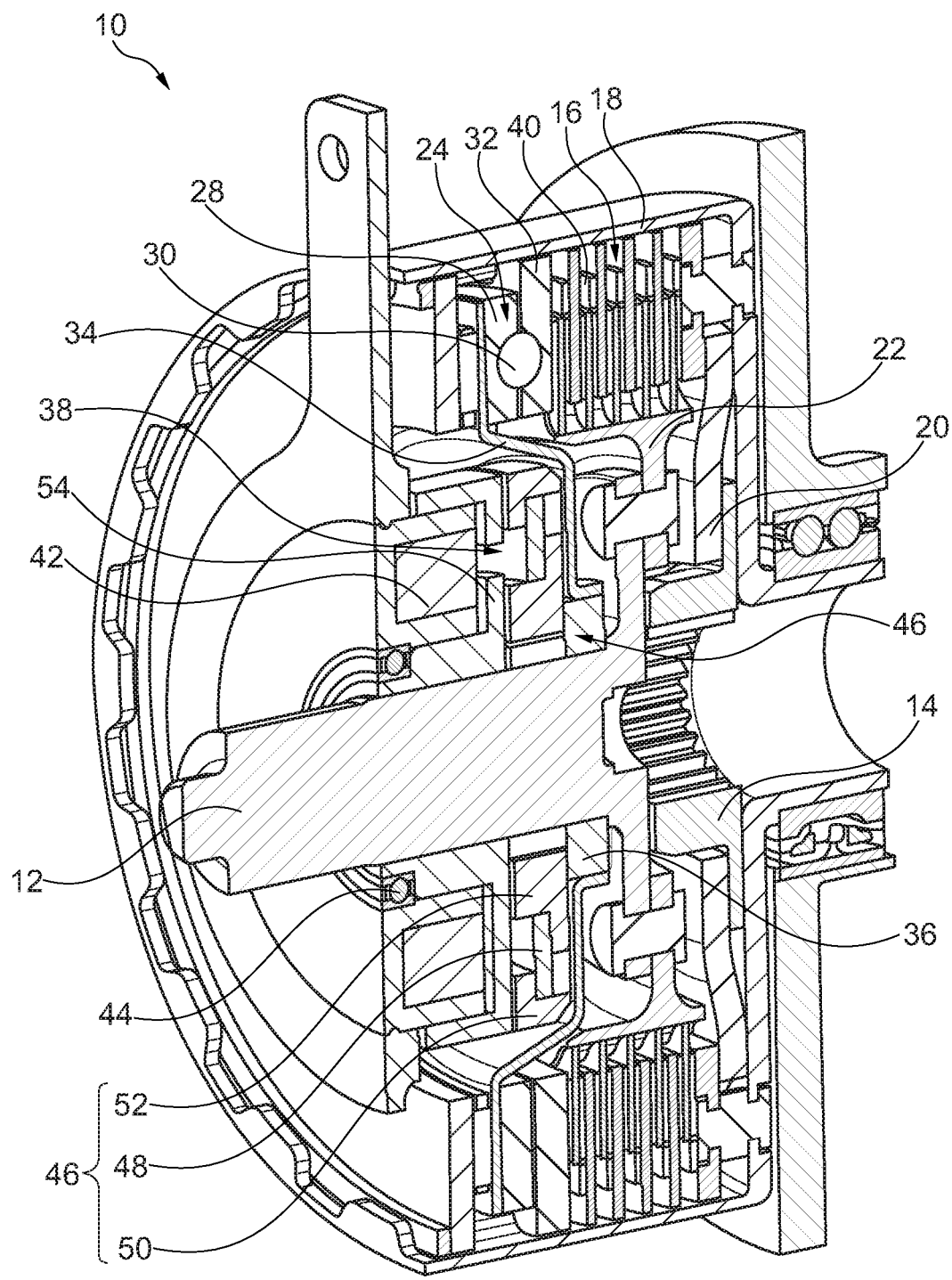
FIG. 2 shows a schematic, perspective sectional view of the clutch system in FIG. 1.

The clutch system 10 represented in FIG. 1 and FIG. 2 includes a torque admission element 12 in the form of a drive shaft of a motor vehicle engine embodied as a crankshaft, which can be coupled, for example, to a torque release element 14 in the form of a transmission input shaft of a motor vehicle transmission. An electrical machine may also act upon the torque release element 14, in order to exchange a torque. For this purpose, the electrical machine includes a current-carrying stator, which is capable of interacting with a rotor coupled to the torque release element 14. If necessary the torque release element may include magnets interacting with the stator and thereby form the rotor of the electrical machine. A disconnect clutch may be provided between the torque admission element 12 and the motor vehicle engine and/or between the torque release element 14 and the motor vehicle transmission, in order to be able to shift gears in the motor vehicle transmission with the motor vehicle engine running.

The torque admission element 12 may be coupled to the torque release element 14 by way of a friction clutch 16 embodied a multi-plate clutch. For this purpose, the friction clutch 16 includes an output part 18 in the form of an outside plate carrier, which is coupled to the torque release element 14 by way of a compensating element 20 in order to compensate for any misalignment in a radial direction and/or in a peripheral direction. In particular, the output part 18, radially outside, may carry a stator of the electrical machine and be provided with stator permanent magnets in order to form the stator. The friction clutch 16 moreover includes an input part 22 in the form of an inner plate carrier riveted to the torque admission element 12. The friction clutch 16 can be actuated by means of a ramp system 24. For this purpose, the ramp system 24 includes an input ramp 28, which is supported by an axial bearing 26 so that it is axially immovable and which by way of a ball 30 can be rotated relative to an output ramp 32. The output ramp 32 can thereby be displaced axially as a pressure plate of the friction clutch 16 in order to press the friction and/or steel plates of the friction clutch 16 when closing the friction clutch 16.

A cupped driver 34, which serves to rotate the input ramp 28, acts on the input ramp 28. The driver 34 is rotatably supported by way of a radial bearing 36 on the torque admission element 12. A magnetic clutch 38 serves to bridge the radial bearing 36, coupling the driver 34 to the torque admission element 12. With the friction clutch 16 opened and the magnetic clutch 38 closed, the input ramp 28 is coupled to the torque admission element 12 by way of the driver 34, whilst the output ramp 32 is coupled to the torque release element 14 by way of the output part 18, so that owing to a speed differential between the torque admission element 12 and the torque release element 14 the input ramp 28 can be rotated relative to the output ramp 32. Here the axial extent of the ramp system 24 can increase and the friction clutch 16 can be closed, particularly in the event of an overtaking torque admission element 12. When the magnetic clutch 38 is opened, the input ramp 28 is no longer supported by the driver 34, rotatably supported relative to the former. The friction clutch 16 can thereby open automatically owing to pretensioned return spring elements 40 in the form of undulated springs, for example, and can reduce the axial extent of the ramp system 24.

Figure 3:
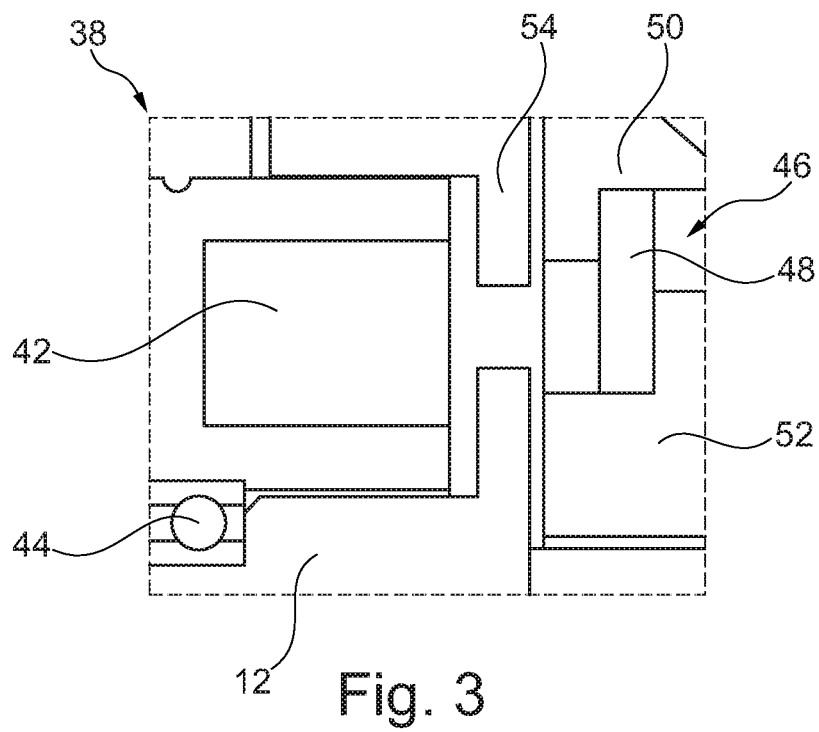
FIG. 3 shows a schematic detailed view of a magnetic clutch of the clutch system in FIG. 1

The magnetic clutch 38 represented in detail in FIG. 3 includes a fixed solenoid 42, on which the torque admission element 12 is supported by way of a radially inner shaft bearing 44. The solenoid 42 is capable of generating an electrical field, which is capable of acting on an axially displaceable armature disk 46. In the exemplary embodiment shown the armature disk 46 includes a permanent magnet 48, which is magnetically attached to a soft-magnetic outer armature part 50 and a soft-magnetic inner armature part 52. The permanent magnet 48 means that the magnetic clutch 38 is designed as a "normally closed" clutch, that is to say the permanent magnet 48 is able to press the armature parts 50, 52 frictionally against a friction disk 54, rotationally fixed to the torque admission element 12, as a result of the magnetic field generated by the permanent magnet 48, in order to close the magnetic clutch. When the solenoid 42 is energized with a current in a first current direction, the solenoid 42 can generate a magnetic force having a repelling action on the permanent magnet 48, in order largely to compensate for the magnetic field of the permanent magnet. In this case a leaf spring connected to the armature disk 46 and the driver 34 is able to pull the armature disk 46 away from the friction disk 46 and thereby open the magnetic clutch 38. When the solenoid 42 is energized with a current in a second current direction opposed to the first current direction, the contact pressure between the armature disk 46 and the friction disk 54 can be increased.

Figure 4:
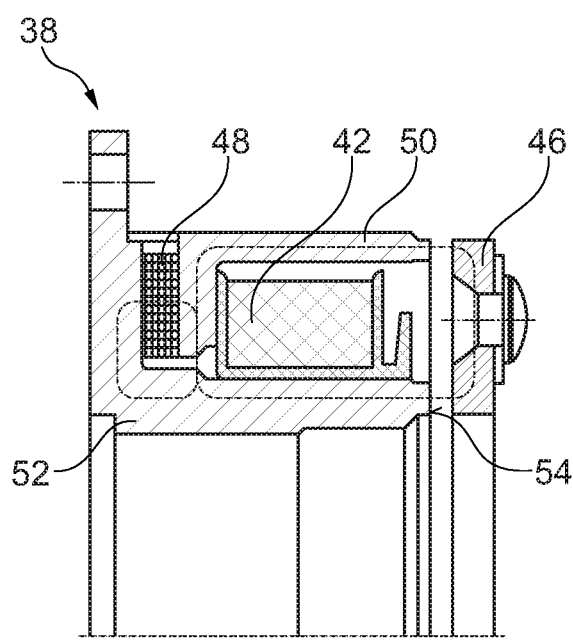
FIG. 4 shows a schematic detailed view of an alternative magnetic clutch for the clutch system in FIG. 1 in the opened state and FIG. 5 shows a schematic detailed view of the magnetic clutch in FIG. 4 in the closed state.
Figure 5:
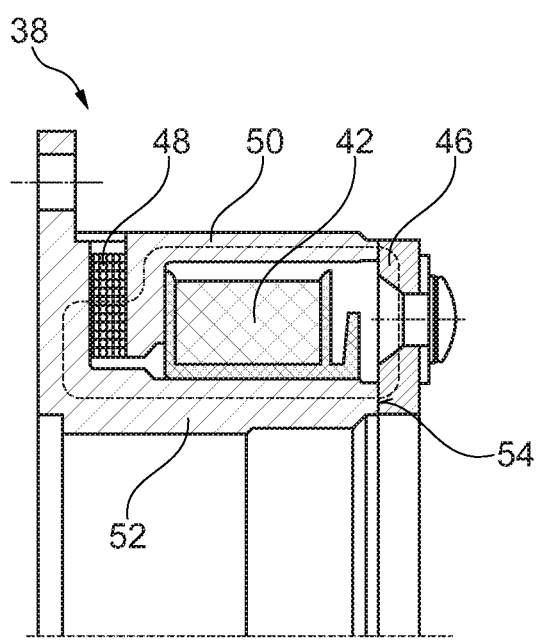

In the embodiment of the magnetic clutch 38 represented in FIG. 4 and FIG. 5 as compared to the embodiment of the magnetic clutch 38 represented in FIG. 3, the permanent magnet 48 and the armature parts 50, 52 is shifted away from the armature disk 46 into the area opposite the armature disk 46. The permanent magnet 48 and the armature parts 50, 52 may thereby be part of the friction disk 54. The weight of the armature disk 46 to be displaced can thereby be reduced. The solenoid 42 is preferably arranged in an axial direction between the permanent magnet 48 and the armature disk 46. In particular, the armature parts 50, 52 together with the permanent magnet 48 may form a horseshoe magnet. The solenoid 42 can be inserted in a radial direction between the armature parts 50, 52. The solenoid 42 can thereby easily compensate for the magnetic field generated by the permanent magnet 48.

LIST OF REFERENCE NUMERALS

10 clutch system
12 torque admission element
14 torque release element
16 friction clutch
18 output part
20 compensating element
22 input part
24 ramp system
26 axial bearing
28 input ramp
30 ball
32 output ramp
34 driver
36 radial bearing
38 magnetic clutch
40 return spring element
42 solenoid
44 shaft bearing
46 armature disk
48 permanent magnet
50 outer armature part
52 inner armature part
54 friction disk

The invention claimed is:

1. A clutch system for a motor vehicle comprising:
    a friction clutch comprising a pressure plate, the friction clutch arranged for transmitting a torque between a torque admission element and a torque release element;
    a ramp system for axially displacing the pressure plate, the ramp system comprising:
        an input ramp; and,
        an output ramp, rotatable relative to the input ramp, for varying an axial extent of the ramp system as a result of a speed differential between the torque admission element and the torque release element;
    a driver coupled to the input ramp and supported so as to allow relative rotation on the torque admission element;
    a return spring; and
    a magnetic clutch for rotationally coupling the driver to the torque admission element, the magnetic clutch comprising:
        a permanent magnet;
        an armature disk:
            rotationally fixed and axially displaceable relative to the driver;
            connected to the driver by the return spring for opening the magnetic clutch in case of a reduction in a magnetic field generated by the permanent magnet; and,
            displaceable by the permanent magnet for automatically closing the magnetic clutch; and, a solenoid for opening the magnetic clutch, the solenoid arranged for generating an electromagnetic field to repel the permanent magnet.

2. The clutch system of claim 1, wherein:
the driver is supported on the torque admission element by a radial bearing; and,
the radial bearing can be bridged by the magnetic clutch.

3. The clutch system of claim 2 wherein the radial bearing is designed as a rolling element bearing.

4. The clutch system of claim 1, wherein:
the magnetic clutch comprises a soft-magnetic outer armature part arranged at least partially outside the permanent magnet; and,
the permanent magnet is magnetically coupled to the soft-magnetic outer armature part.

5. The clutch system of claim 4 wherein the permanent magnet is adhesively bonded to the soft-magnetic outer armature part or cast with the soft-magnetic outer armature part.

6. The clutch system of claim 4, wherein:
the magnetic clutch comprises a friction disk coupled in a torque-transmitting manner to the torque admission element; and
the friction disk is disposed axially between the armature disk and the solenoid for producing a frictional contact with the soft-magnetic outer armature part.

7. The clutch system of claim 1 wherein:
the magnetic clutch comprises a soft-magnetic inner armature part arranged at least partially inside the permanent magnet; and,
the permanent magnet is magnetically coupled to the soft-magnetic inner armature part.

8. The clutch system of claim 7, wherein:
the permanent magnet is adhesively bonded to the soft-magnetic inner armature part or cast with the soft-magnetic inner armature part.

9. The clutch system of claim 7, wherein:
the magnetic clutch comprises a friction disk coupled in a torque-transmitting manner to the torque admission element; and
the friction disk is disposed axially between the armature disk and the solenoid for producing a frictional contact with the soft-magnetic inner armature part.

10. The clutch system of claim 1 wherein:
the solenoid is connected to a direct current source; and,
the direct current source is capable of providing a first direct current in a first current direction and a second direct current in a second current direction opposed to the first current direction.

11. The clutch system of claim 10 wherein a current strength of the first direct current or the second direct current is variably adjustable.

12. The clutch system of claim 1 wherein the return spring is designed as a leaf spring.

13. The clutch system of claim 1 further comprising a compensating element, wherein:
the friction clutch comprises an output plate carrier coupled to the torque release element by the compensating element; or,
the friction clutch comprises an input plate carrier coupled to the torque release element by the compensating element.

14. The clutch system of claim 13 wherein the compensating element is to compensate for any misalignment of the torque admission element relative to the torque release element in a radial direction or in a peripheral direction.

15. The clutch system of claim 1 wherein the friction clutch is a multi-plate clutch.

16. A clutch system for a motor vehicle comprising:
a friction clutch comprising a pressure plate, the friction clutch arranged for transmitting a torque between a torque admission element and a torque release element;
a ramp system for axially displacing the pressure plate, the ramp system comprising:
an input ramp; and,
an output ramp, rotatable relative to the input ramp, for varying an axial extent of the ramp system as a result of a speed differential between the torque admission element and the torque release element;
a driver coupled to the input ramp and supported so as to allow relative rotation on the torque admission element; and,
a magnetic clutch for rotationally coupling the driver to the torque admission element, the magnetic clutch comprising:
a permanent magnet;
a soft-magnetic outer armature part arranged at least partially outside the permanent magnet;
an armature disk:
rotationally fixed and axially displaceable relative to the driver; and,
displaceable by the permanent magnet for automatically closing the magnetic clutch;
a solenoid for opening the magnetic clutch, the solenoid arranged for generating an electromagnetic field to repel the permanent magnet;
a friction disk:
coupled in a torque-transmitting manner to the torque admission element; and
disposed axially between the armature disk and the solenoid for producing a frictional contact with the soft-magnetic outer armature part, wherein the permanent magnet is magnetically coupled to the soft-magnetic outer armature part.

17. A clutch system for a motor vehicle comprising:
a friction clutch comprising a pressure plate, the friction clutch arranged for transmitting a torque between a torque admission element and a torque release element;
a ramp system for axially displacing the pressure plate, the ramp system comprising:
an input ramp; and,
an output ramp, rotatable relative to the input ramp, for varying an axial extent of the ramp system as a result of a speed differential between the torque admission element and the torque release element;
a driver coupled to the input ramp and supported so as to allow relative rotation on the torque admission element; and,
a magnetic clutch for rotationally coupling the driver to the torque admission element, the magnetic clutch comprising:
a permanent magnet;
a soft-magnetic inner armature part arranged at least partially inside the permanent magnet;
an armature disk:
rotationally fixed and axially displaceable relative to the driver; and,
displaceable by the permanent magnet for automatically closing the magnetic clutch;
a solenoid for opening the magnetic clutch, the solenoid arranged for generating an electromagnetic field to repel the permanent magnet;
a friction disk:

coupled in a torque-transmitting manner to the torque admission element; and disposed axially between the armature disk and the solenoid for producing a frictional contact with the soft-magnetic inner armature part, wherein the permanent magnet is magnetically coupled to the soft-magnetic inner armature part.

\* \* \* \* \*